United States Patent
Liu

(10) Patent No.: US 11,708,088 B2
(45) Date of Patent: Jul. 25, 2023

(54) DYNAMICALLY MODIFYING COLLISION AVOIDANCE RESPONSE PROCEDURE IN AUTONOMOUS VEHICLES

(71) Applicant: Beijing Voyager Technology Co., Ltd., Beijing (CN)

(72) Inventor: Yue Liu, Mountain View, CA (US)

(73) Assignee: Beijing Voyager Technology Co., Ltd., Beijing (CN)

( * ) Notice: Subject to any disclaimer, the term of this patent is extended or adjusted under 35 U.S.C. 154(b) by 242 days.

(21) Appl. No.: 17/005,103

(22) Filed: Aug. 27, 2020

(65) Prior Publication Data

US 2022/0063664 A1 Mar. 3, 2022

(51) Int. Cl.
*B60W 60/00* (2020.01)
*G08G 1/0962* (2006.01)
(Continued)

(52) U.S. Cl.
CPC ........ *B60W 60/0011* (2020.02); *B60W 10/18* (2013.01); *B60W 10/20* (2013.01);
(Continued)

(58) Field of Classification Search
CPC ......... B60W 60/0011; B60W 60/0015; B60W 10/18; B60W 10/20; B60W 30/09; B60W 30/0956; B60W 2554/4041; B60W 2554/4029; B60W 2554/80; B60W 2420/52; B60W 2420/05; G06N 20/00;
(Continued)

(56) References Cited

U.S. PATENT DOCUMENTS 9,632,502 B1 * 4/2017 Levinson ............ H04L 41/0816
10,253,468 B1 4/2019 Linville et al.
(Continued)

FOREIGN PATENT DOCUMENTS

JP 2018172051 A 11/2018
KR 20150128314 A 11/2015

OTHER PUBLICATIONS

International Search Report and Written Opinion for PCT/US2021/045396 dated Nov. 16, 2021, 10 pages.

*Primary Examiner* — Tarek Elarabi
(74) *Attorney, Agent, or Firm* — Kilpatrick Townsend & Stockton LLP

(57) ABSTRACT

A computer-implemented method for controlling a vehicle comprises: receiving tracking data associated with a surrounding environment of the vehicle; detecting, based upon the tracking data, an object in the surrounding environment of the vehicle; determining a location of the object; determining, based on navigation assistance data, whether the location of the object is at least partially within a classified area in the surrounding environment; and configuring a control system of the vehicle to: initiate, based upon determining that the location of the object is not at least partially within the classified area, a first collision avoidance response procedure for responding to the object; and initiate, based upon determining that the location of the object is at least partially within the classified area, a second collision avoidance response procedure for responding to the object, the second collision avoidance response procedure different from the first collision avoidance response procedure.

20 Claims, 10 Drawing Sheets

(51) Int. Cl.
*B60W 30/095* (2012.01)
*B60W 30/09* (2012.01)
*G01S 19/42* (2010.01)
*G01C 21/00* (2006.01)
*B60W 10/20* (2006.01)
*B60W 10/18* (2012.01)
*G06N 20/00* (2019.01)
*G06N 5/04* (2023.01)
*G08G 1/16* (2006.01)

(52) U.S. Cl.
CPC ........ *B60W 30/09* (2013.01); *B60W 30/0956* (2013.01); *B60W 60/0015* (2020.02); *G01C 21/38* (2020.08); *G01S 19/42* (2013.01); *G06N 5/04* (2013.01); *G06N 20/00* (2019.01); *G08G 1/09626* (2013.01); *G08G 1/166* (2013.01); *B60W 2420/52* (2013.01); *B60W 2420/54* (2013.01); *B60W 2554/4029* (2020.02); *B60W 2554/4041* (2020.02); *B60W 2554/80* (2020.02)

(58) Field of Classification Search
CPC .......... G06N 5/04; G01C 21/38; G01S 19/42; G08G 1/09626; G08G 1/166
See application file for complete search history.

(56) References Cited

U.S. PATENT DOCUMENTS

| | | |
|---|---|---|
| 10,715,952 B1 | 7/2020 | Lemieux |
| 10,730,531 B1* | 8/2020 | Phillips ................ G05D 1/0088 |
| 2004/0158355 A1 | 8/2004 | Holmqvist et al. |
| 2017/0123419 A1* | 5/2017 | Levinson ................ H04L 67/12 |
| 2017/0336790 A1* | 11/2017 | Glebov .................. G01C 21/00 |
| 2017/0372150 A1 | 12/2017 | Mayser |
| 2018/0129220 A1 | 5/2018 | Beach et al. |
| 2019/0011910 A1* | 1/2019 | Lockwood ............. G08G 1/164 |
| 2019/0265703 A1 | 8/2019 | Hicok et al. |
| 2020/0327317 A1 | 10/2020 | Park |
| 2022/0326717 A1 | 10/2022 | Beach et al. |

\* cited by examiner

DYNAMICALLY MODIFYING COLLISION AVOIDANCE RESPONSE PROCEDURE IN AUTONOMOUS VEHICLES

BACKGROUND

Pedestrians are vulnerable to the dangers of the road and can sustain serious or fatal injuries in a collision with a vehicle. Many vehicles (autonomous and non-autonomous) incorporate technology to detect nearby humans or other objects and can provide some automated assistance to help a driver avoid a potential collision.

A fully autonomous vehicle (level-5 automation) generally analyzes and reacts to the surroundings of the vehicle without requiring any input from a driver. For example, a fully autonomous vehicle may slow down or completely stop upon detecting pedestrians on the pathway of the vehicle. Autonomous vehicles are generally equipped with various sensors, such as Light Detection and Ranging (Li-DAR) systems, automotive radar systems, Doppler radar systems, or one or more cameras, for detecting objects in the surrounding area of the vehicle. Many contemporary vehicles can use the sensor data and corresponding algorithms to guide, control, and drive the vehicle more safely and to attempt to avoid any collisions on the pathway. However, some vehicle control systems may be overly conservative in their collision avoidance response procedures, which can reduce the quality of the driving experience of the passengers and/or unnecessarily reduce the efficiency of the vehicles during operation. Although vehicle control systems (e.g., autonomous driving systems) have improved dramatically in recent years, better vehicle control systems for autonomous and partially autonomous vehicles are needed to both ensure the safety of pedestrians and improve driving efficiency and user experience.

BRIEF SUMMARY

Techniques disclosed herein relate generally to autonomous vehicles. More specifically, and without limitation, disclosed herein are techniques for operating autonomous vehicles, in particular, in areas where pedestrians may be present but may not be expected to move into the pathways of the vehicles, such as a public transport stop area, a school zone, and a loading area. Various inventive embodiments are described herein, including systems, modules, subsystems, devices, components, circuits, methods, code, instructions, computer-readable storage medium, and the like.

Certain embodiments of a computer-implemented method for controlling a vehicle, the method performed by one or more processors and including: receiving tracking data associated with a surrounding environment of the vehicle; detecting, based upon the tracking data, an object in the surrounding environment of the vehicle; determining a location of the object; determining, based on navigation assistance data, whether the location of the object is at least partially within a classified area in the surrounding environment; and configuring a control system of the vehicle to: initiate, based upon determining that the location of the object is not at least partially within the classified area, a first collision avoidance response procedure for responding to the object; and initiate, based upon determining that the location of the object is at least partially within the classified area, a second collision avoidance response procedure for responding to the object, the second collision avoidance response procedure different from the first collision avoidance response procedure. The tracking data can include at least one of: one or more images of the surrounding environment captured be one or more cameras; LiDAR data for the surrounding environment; radar data for the surrounding environment; or sensor data captured by one or more ultrasonic sensors. In some cases, detecting the object in the surrounding environment of the vehicle can include detecting the object using a computer vision technique or a machine learning technique. Determining the location of the object can comprise at least one of: determining a location of the vehicle using a Global Navigation Satellite System receiver; or determining, based on the tracking data, a relative location of the object with respect to the vehicle, wherein the location of the object can include latitude and longitude coordinates of the object.

In some embodiments, the navigation assistance data includes a map and the classified area is represented by a two-dimensional polygon in an area of the map corresponding to the surrounding environment of the vehicle. Determining whether the location of the object is at least partially within the classified area can include determining whether coordinates of the object are within the two-dimensional polygon. The classified area may include at least one of a public transport stop area (e.g., bus stop, trolley stop, taxi stop, shuttle stop, automobile-for-hire stop, etc.), a school area, a loading area, or the like. In some embodiments, the second collision avoidance response procedure can include reducing a speed of the vehicle and ignoring the object. The first collision avoidance response procedure can include: determining, based upon the tracking data, that the object is a moving object; determining, based upon the tracking data, a projected distance of impact from the moving object; and operating the vehicle based on the projected distance of impact from the moving object.

In some implementations, operating the vehicle based on the projected distance of impact from the moving object includes at least one of: steering the vehicle to laterally shift the vehicle away from the object; applying a brake to the vehicle to reduce a speed of the vehicle; or applying brakes to the vehicle to stop the vehicle. The projected distance of impact from the moving object can include an amplified distance of impact from the moving object. The object can include a pedestrian, an animal, an inanimate object, or the like. The method can further include: tracking the object and configuring, based on the location of the object during the tracking, the control system of the vehicle to perform at least one of: changing from the first collision avoidance response procedure to the second collision avoidance response procedure; or changing from the second collision avoidance response procedure to the first collision avoidance response procedure.

In some embodiments, a control system for an autonomous vehicle comprises: one or more processors and a non-transitory computer-readable storage medium storing computer-executable instructions that, when executed by the one or more processors, causing the one or more processors to perform operations including: receiving tracking data associated with a surrounding environment of the vehicle; detecting, based upon the tracking data, an object in the surrounding environment of the vehicle; determining a location of the object; determining, based on navigation assistance data, whether the location of the object is at least partially within a classified area in the surrounding environment; and configuring a control system of the vehicle to: initiate, based upon determining that the location of the object is not at least partially within the classified area, a first collision avoidance response procedure for responding to the object; and initiate, based upon determining that the location of the object is at least partially within the classified area, a second collision avoidance response procedure for responding to the object, the second collision avoidance response procedure different from the first collision avoidance response procedure. In some cases, the tracking data can include at least one of: one or more images of the surrounding environment captured be one or more cameras; LiDAR data for the surrounding environment; radar data for the surrounding environment; or sensor data captured by one or more ultrasonic sensors. In some aspects, the navigation assistance data includes a map and the classified area is represented by a two-dimensional polygon in an area of the map corresponding to the surrounding environment of the vehicle, wherein determining whether the location of the object is at least partially within the classified area includes determining whether coordinates of the object are within the two-dimensional polygon, and wherein the classified area includes at least one of a public transport stop area, a school area, or a loading area.

In further embodiments, a non-transitory computer-readable storage medium storing computer-executable instructions that, when executed by one or more processors of a computing system, causing the one or more processors to perform operations including: receiving tracking data associated with a surrounding environment of a vehicle; detecting, based upon the tracking data, an object in the surrounding environment of the vehicle; determining a location of the object; determining, based on navigation assistance data, whether the location of the object is at least partially within a classified area in the surrounding environment; and configuring a control system of the vehicle to: initiate, based upon determining that the location of the object is not at least partially within the classified area, a first collision avoidance response procedure for responding to the object; and initiate, based upon determining that the location of the object is at least partially within the classified area, a second collision avoidance response procedure for responding to the object, the second collision avoidance response procedure different from the first collision avoidance response procedure. In some cases, the tracking data includes at least one of: one or more images of the surrounding environment captured be one or more cameras; LiDAR data for the surrounding environment; radar data for the surrounding environment; or sensor data captured by one or more ultrasonic sensors. The navigation assistance data may include a map, wherein the classified area is represented by a two-dimensional polygon in an area of the map corresponding to the surrounding environment of the vehicle, and wherein determining whether the location of the object is at least partially within the classified area includes determining whether coordinates of the object are within the two-dimensional polygon, wherein the classified area includes at least one of a public transport stop area, a school area, or a loading area.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that, although the present system and methods have been specifically disclosed by examples and optional features, modification and variation of the concepts herein disclosed should be recognized by those skilled in the art, and that such modifications and variations are considered to be within the scope of the systems and methods as defined by the appended claims.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

BRIEF DESCRIPTION OF THE DRAWINGS

The features of the various embodiments described above, as well as other features and advantages of certain embodiments of the present disclosure will be more apparent from the following detailed description taken in conjunction with the accompanying drawings, in which.

Figure 1:
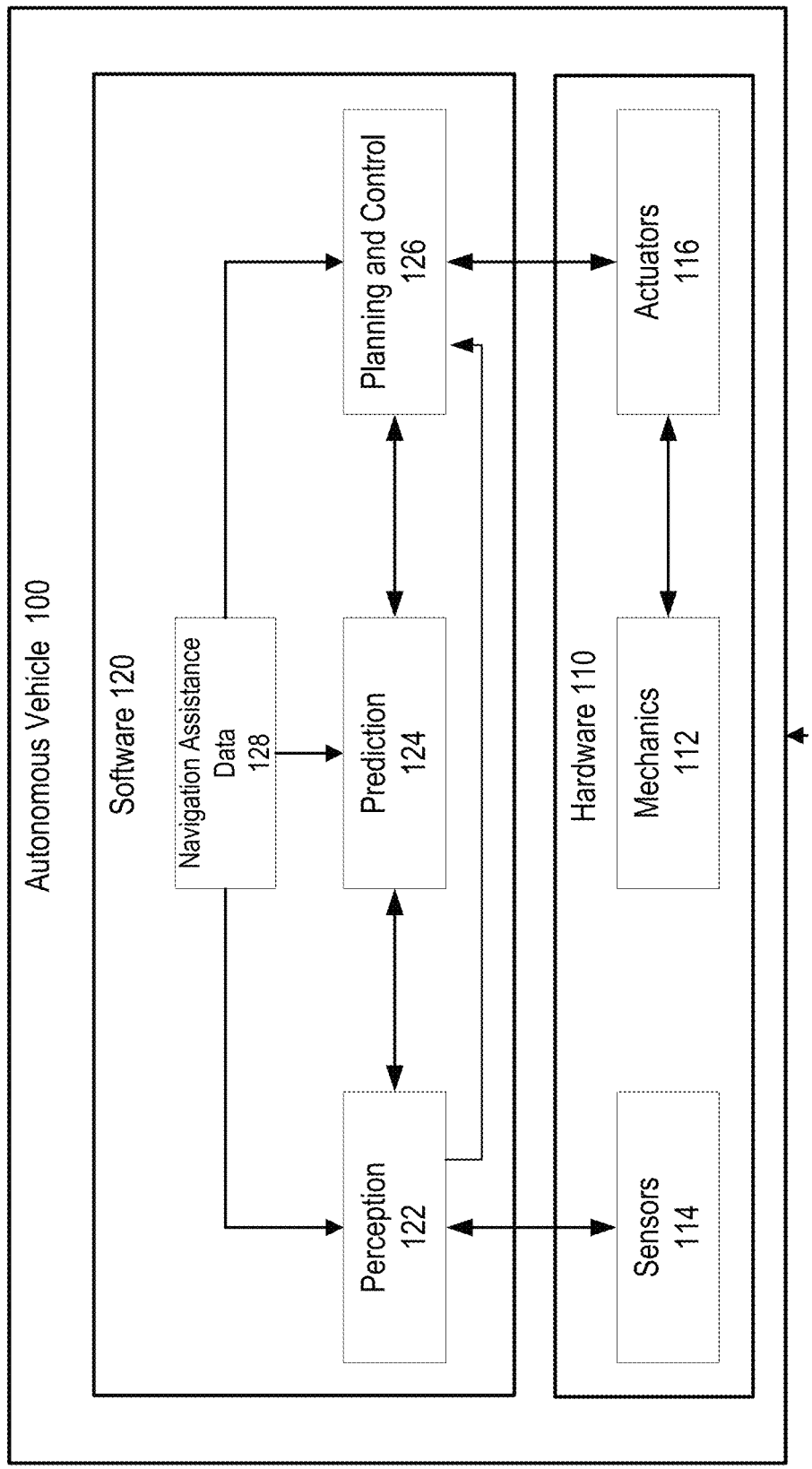
FIG. 1 is a simplified block diagram of an example of an autonomous vehicle according to certain embodiments.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

DETAILED DESCRIPTION

This disclosure relates generally to autonomous vehicles. More specifically, and without limitation, disclosed herein are techniques for operating autonomous vehicles, in particular, in areas where pedestrians may be present but may not be expected to move into the pathways of the vehicles, such as a public transport stop area, a school zone, or a loading area. Various inventive embodiments are described herein, including systems, modules, subsystems, devices, components, circuits, methods, code, instructions, computer-readable storage medium, and the like.

Conceptual overviews of certain embodiments are provided herein. The following high level overview is intended to provide the reader with a baseline understanding of some of the novel aspects of the present disclosure and a roadmap to the details that follow. This overview is not intended to identify key or essential features of the figures or the claimed subject matter, nor is it intended to be used in isolation to determine the scope of the claimed subject matter. Each figure referred to in this overview is further described below in greater detail and for broader application.

Many autonomous vehicles use sensor data and corresponding algorithms to guide, control, and drive the vehicles more safely and to attempt to avoid any collisions. However, some autonomous vehicles may be overly conservative in their collision avoidance response procedures, which may cause abrupt brakes, stops, or swerves, thus reducing the quality of passenger experience and/or the efficiency of the vehicles. For example, when a pedestrian or another object is detected and determined to be close to an autonomous vehicle's predicted or planned trajectory, the vehicle control system of the autonomous vehicle may swerve or laterally shift to try to move away from the object. When a pedestrian or another object detected in the surrounding environment of the autonomous vehicle is determined to move, the autonomous vehicle may brake suddenly to avoid potential collisions, even though the moving object may not enter the vehicle's pathway at all. While it is desirable to identify pedestrians that may be on the pathway of a vehicle to avoid potential collisions, unnecessary sudden reactions (e.g., sudden braking, hard stops, or swerving) may also need to be avoided to improve the passenger experience and operational efficiency of the vehicle. For example, a pedestrian at a bus stop may be waiting for the bus, getting out of the bus, or getting into the bus, and thus is unlikely to enter the vehicle traffic lane next to the bus stop. As such, the autonomous vehicle may not need to respond to the movement of the pedestrian in the bus stop in a conventional manner, such as braking, stopping, swerving, etc., whereas merely slowing down may be a prudent course of action.

According to certain embodiments, an autonomous vehicle may react to an object or pedestrian detected at a bus stop or a similar area in a manner different from how it would respond to an object or pedestrian detected in other areas where entrance into the vehicle traffic lanes may be more likely and imminent. In one example, the autonomous vehicle may detect one or more objects (e.g., pedestrians, objects, etc.) in the surrounding environment based on sensor data. Upon detection of an object, the vehicle control system of the autonomous vehicle may determine the location of the object and operate the autonomous vehicle according to different collision avoidance response procedures based on the classification of the location of the detected object. For example, if the detected object is determined to be in an area where a pedestrian may enter the vehicle traffic lanes, such as an intersection or most areas next to a street, the vehicle control system of the autonomous vehicle may operate according to a conservative collision avoidance response procedure, where the speed or predicted travel distance of a moving object may be amplified when determining the actions to take by the vehicle to avoid potential collisions. On the other hand, if the detected object (e.g., a pedestrian) is determined to be in an area where pedestrians may be present but may not be expected to move into the pathways of the vehicle, such as a bus stop, a loading zone, or another waiting area, the vehicle control system of the autonomous vehicle may operate in a cautious mode (e.g., at a low but relatively constant speed), while passing the detected object. As a result, the vehicle may avoid or reduce unnecessary brakes, stops, or swerves, while still avoiding any potential collisions with pedestrians.

Figure 3:
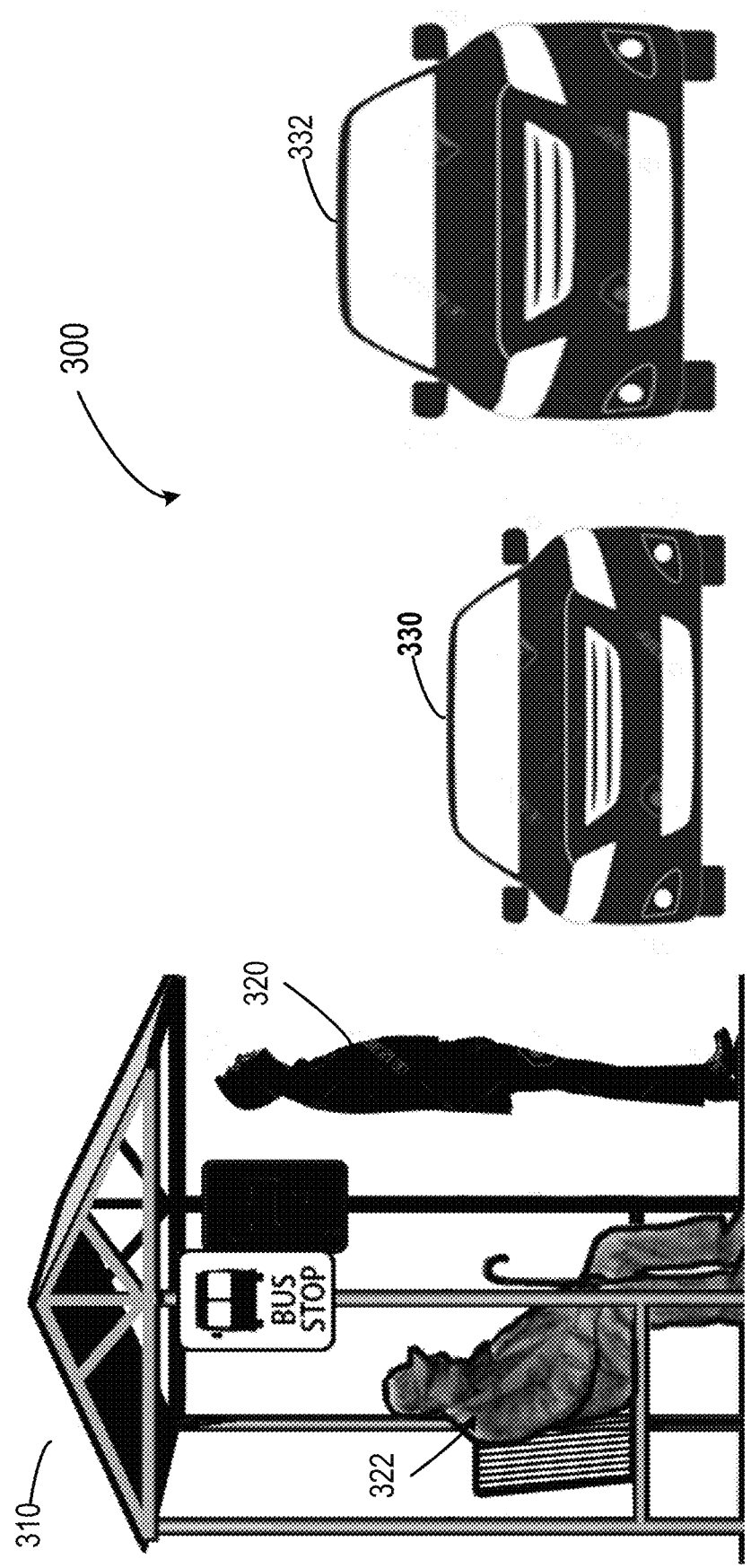
FIG. 3 illustrates an example of an autonomous vehicle passing by a bus stop with passengers waiting at the bus stop.
Figure 4:
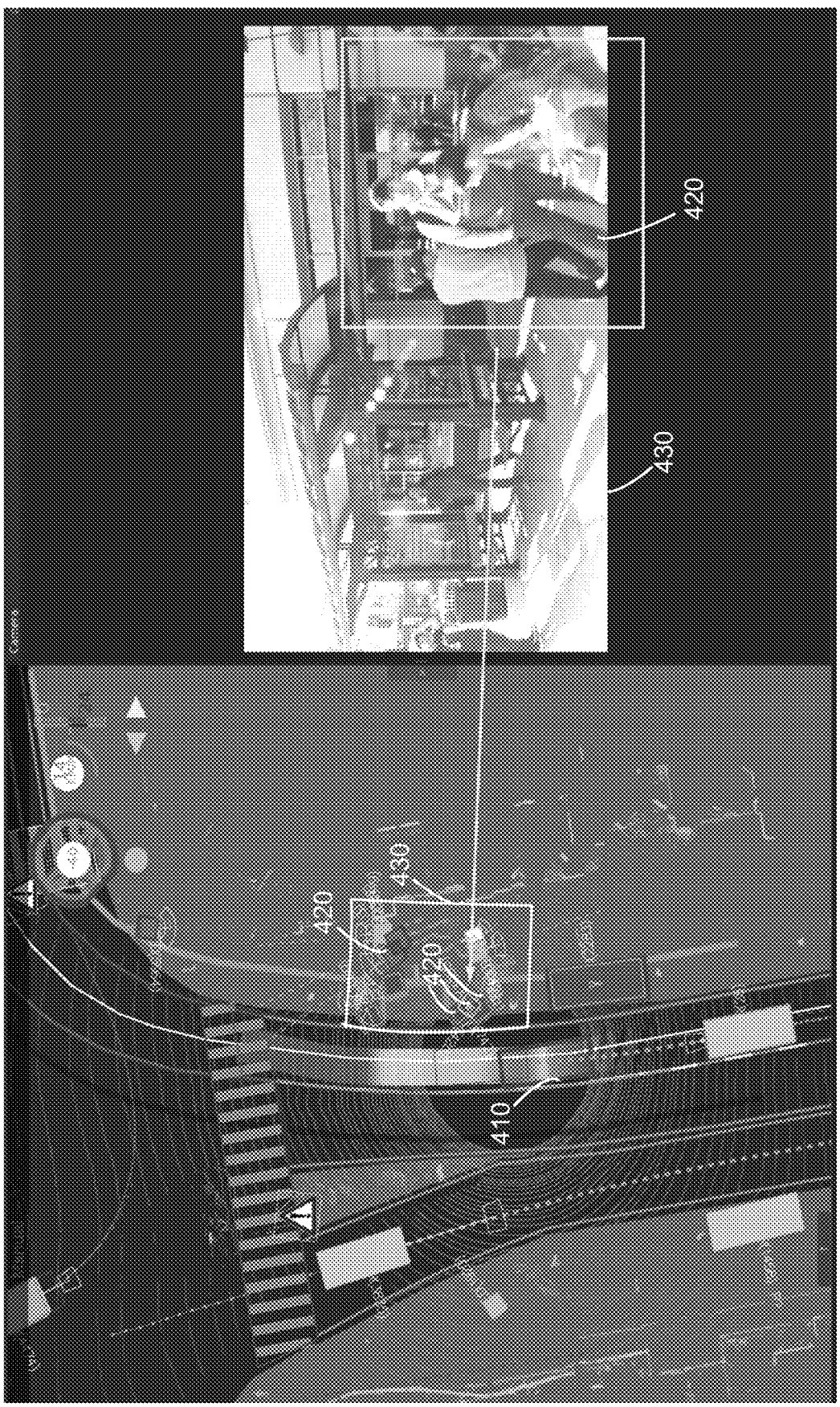
FIG. 4 illustrates an example of a vehicle responding to pedestrians at a bus stop.
Figure 5:
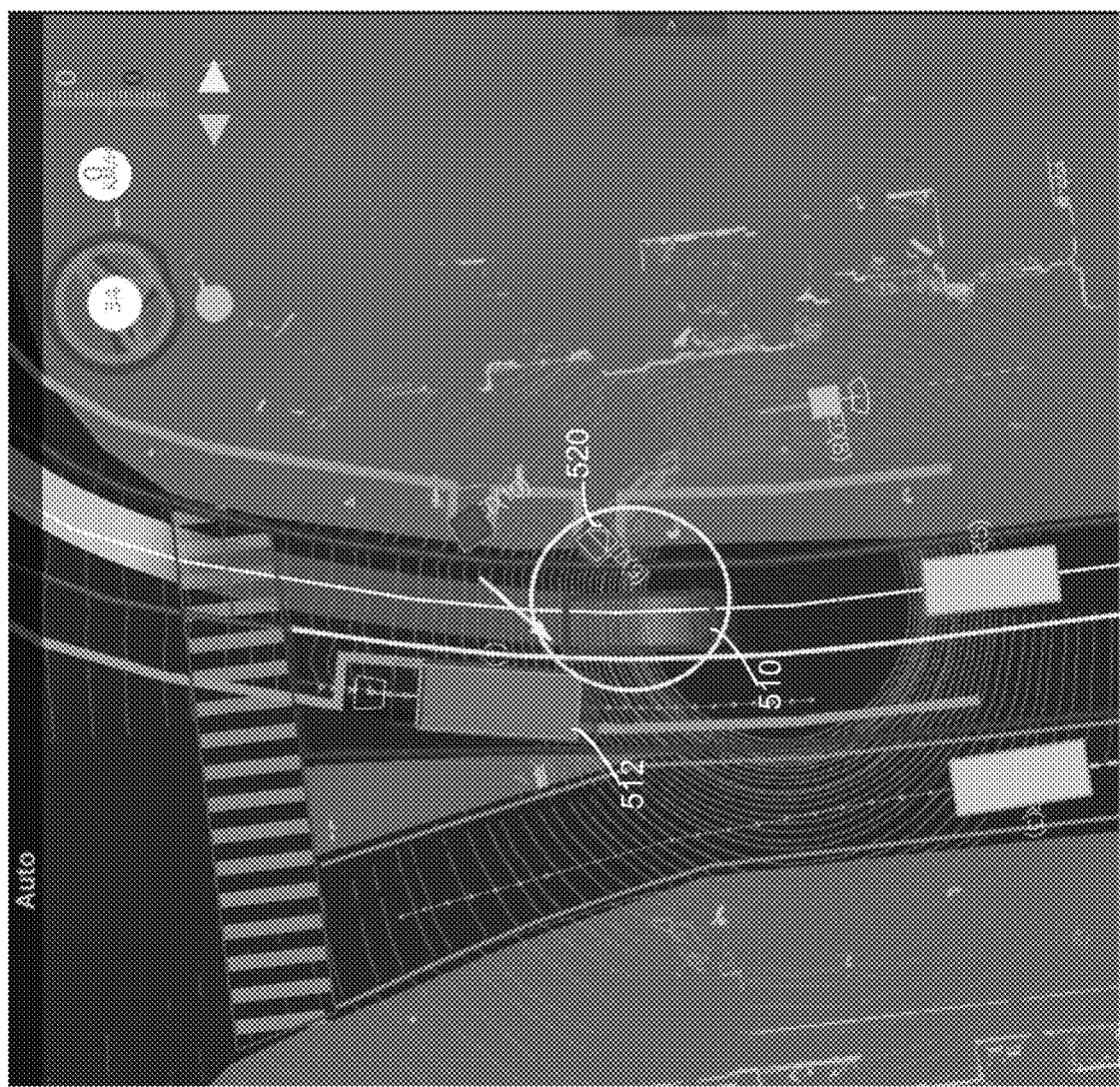
FIG. 5 illustrates another example of a vehicle responding to a pedestrian at a bus stop.

Techniques disclosed herein relate generally to dynamically modifying a collision avoidance response procedure of an autonomous vehicle based on the location of the detected object(s) (e.g., a pedestrian) in the vehicle's surrounding area. Specifically, FIGS. 1-2 describe examples of hardware and software subsystems of an example of an autonomous vehicle. The autonomous vehicle generally includes sensors (e.g., a camera, a Light Detection and Ranging (LiDAR) sensor, a radar, a Global Positioning System (GPS) receiver, etc.) for collecting information regarding the surrounding environment of the autonomous vehicle; software for performing perception, prediction, and planning and control based on the information collected by the sensor; and actuators for performing the planned actions. The software may generally make exaggerated predictions of the trajectories of objects near the vehicle, for example, by amplifying the speed or travel distance of the detected objects, such that the planning and control modules may take more aggressive preventive actions to avoid potential collisions. This approach may be appropriate for areas where pedestrians are expected to enter the vehicle traffic lanes, but may cause unnecessary sudden braking actions, stops, and/or swerves of the vehicle in areas where pedestrians may be present but may not be expected to enter the vehicle traffic lanes, such as bus stops, school zones, loading zones, or some commercial or residential areas. FIGS. 3-5 illustrate examples of undesirable collision avoidance behaviors of autonomous vehicles, such as unnecessary brakes, stops, swerves or nudges (shifting laterally away from detected objects), in response to object(s) detected at bus stops that are close to the vehicle traffic lanes.

FIGS. 6-9 illustrate examples of methods for dynamically changing the vehicle collision avoidance response procedure based on locations of detected objects and navigation assistance data, such as a high definition map with information of various areas of interest. A perception subsystem of the vehicle may detect an object in the surrounding environment and determine the location, moving speed, and/or moving direction of the object. A prediction subsystem of the vehicle may, based on the navigation assistance data that indicates certain areas of interest (e.g., public transport areas, a school zones, or loading zones), determine whether the object is in an area of interest. If the object is in an area of interest, such as a bus stop, the prediction system may output an intention (e.g., "BUS_STOP_INTENTION") indicating that the object is in a bus stop zone or another area of interest. Otherwise, the prediction system may output an intention (e.g., "FREE_SPACE_INTENTION") indicating that the object is not in a bus stop zone or another area of interest. The planning and control (PNC) subsystem of the vehicle may receive the prediction output and determine the collision avoidance response procedures to take based on the prediction output. For example, in scenarios where the BUS_STOP_INTENTION prediction is received, the PNC subsystem may operate the vehicle at a reduced but relatively constant speed using a collision avoidance response procedure that would ignore objects in a bus stop zone or another area of interest, such that the vehicle would not need to make unnecessary braking actions, stops, swerves, or lateral shifts near the area of interest. The reduced speed may help to ensure that the vehicle would have sufficient time to react in case the object moves out of the area of interest. When the FREE_SPACE_INTENTION prediction is received, the PNC subsystem may operate the vehicle using a more conservative collision avoidance response procedure, such as making braking actions, stops, swerves, and/or a lateral shift, to avoid potential collisions. For example, when a pedestrian that was in a bus stop zone moves out of the bus stop zone, the perception subsystem may detect the pedestrian and the movement, the prediction subsystem may determine that the object is not in the bus stop zone anymore and may generate a FREE_SPACE_INTENTION prediction output, and the PNC subsystem may then operate the vehicle using the more conservative collision avoidance response procedure. As such, the vehicle may dynamically change its collision avoidance response procedure during a trip, based on whether and where an object is detected in the surrounding environment of the vehicle.

This high level overview is presented to provide the reader with a baseline understanding of some of the novel aspects of the present disclosure and a roadmap to the details that follow. This high level overview in no way limits the scope of the various embodiments described throughout the detailed description and each of the figures referenced above are further described below in greater detail and in their proper scope.

In the following description, for the purposes of explanation, specific details are set forth in order to provide a thorough understanding of examples of the disclosure. It will be apparent that various examples may be practiced without these specific details. The ensuing description provides examples only, and is not intended to limit the scope, applicability, or configuration of the disclosure. Rather, the ensuing description of the examples will provide those skilled in the art with an enabling description for implementing an example. It should be understood that various changes may be made in the function and arrangement of elements without departing from the spirit and scope of the disclosure as set forth in the appended claims. The figures and description are not intended to be restrictive. Circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples. The teachings disclosed herein can also be applied to various types of applications such as mobile applications, non-mobile applications, desktop applications, web applications, enterprise applications, and the like. Further, the teachings of this disclosure are not restricted to a particular operating environment (e.g., operating systems, devices, platforms, and the like) but instead can be applied to multiple different operating environments.

Furthermore, examples may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Where components are described as being "configured to" perform certain operations, such configuration may be accomplished, for example, by designing electronic circuits or other hardware to perform the operation, by programming or controlling electronic circuits (e.g., microprocessors, or other suitable electronic circuits) to perform the operation, or any combination thereof.

The word "example" or "exemplary" is used herein to mean "serving as an example, instance, or illustration." Any embodiment or design described herein as "exemplary" or "example" is not necessarily to be construed as preferred or advantageous over other embodiments or designs.

FIG. 1 is a simplified block diagram of an example of an autonomous vehicle 100, according to certain embodiments.

Autonomous vehicle 100 may include hardware 110 and software 120 that may be executed by one or more processors to receive data from hardware 110 and control the operations of hardware 110. FIG. 1 illustrates mechanics 112, sensors 114, and actuators 116 as parts of hardware 110, and perception subsystem 122, prediction subsystem 124, planning and control subsystem 126, and navigation assistance data 128 as parts of software 120. It is noted that the block diagram is for illustration purposes only, and the subsystems of autonomous vehicle 100 may be organized in different manners. For example, the perception subsystem may include sensors 114 and related software for data processing, obstacle detection, object detection, motion detection, and the like. The planning and control subsystem may include actuators 116 and related software for planning the route, determining longitudinal control (e.g., when to apply brake or throttle), lateral control (e.g., steering), and sequence control (e.g., gear level, horn, lamp, etc.), and controlling actuators 116. In some embodiments, at least some parts of software 120 may be implemented in one or more electronic control units (ECUs) or one or more processing units (e.g., microprocessors). The ECUs may include, for example, an engine control unit, a power steering control unit, a powertrain control module, a speed control unit, a telematics control unit, a transmission control unit, a brake control module, and the like.

Sensors 114 may include any number of sensing devices that provide information about autonomous vehicle 100 and/or the ambient environment external to autonomous vehicle 100. Examples of sensors 114 may include, without limitation, a camera, a microphone, a radar sensor, an ultrasonic sensor, a LiDAR sensor, a Global Navigation Satellite System (GNSS) receiver (e.g., a GPS sensor), a steering angle sensor, a motion sensor or an inertial measurement unit (IMU) (e.g., an accelerometer and/or gyroscope), and the like.

Processors or ECUs in autonomous vehicle 100 may use data from sensors 114 and navigation assistance data 128 for automated driving and/or parking. For example, an automated parking feature of autonomous vehicle 100 may include hardware (e.g., one or more actuators 116) and/or software (e.g., instruction code implementing an algorithm) that enables automated performance of parallel, perpendicular, and/or angle parking. In some embodiments, the automated parking feature may include a set of instructions that coordinate between one or more ECUs (e.g., a power steering control unit and/or a powertrain control module) and one or more sensors 114 (e.g., a camera, a radar sensor, an ultrasonic sensor, a GNSS receiver, and/or a LiDAR sensor) during execution of a parking maneuver. An automated braking feature of autonomous vehicle 100 may include hardware (e.g., one or more actuator) and/or software (e.g., instruction code implementing an algorithm) that enables collision avoidance. More specifically, collisions may be avoided based on autonomous application of brakes when an object is detected in a predicted travel path (e.g., a straight/angled forward travel path or a straight/angled reverse travel path) of the vehicle. In some embodiments, the automated braking feature may include a set of instructions that coordinate between one or more ECUs (e.g., a brake control module) and one or more sensors 114 (e.g., a camera, a radar sensor, an ultrasonic sensor, a GNSS receiver, and/or a LiDAR sensor) to determine when to perform braking.

Perception subsystem 122 may be used to process sensor data to determine status and information regarding autonomous vehicle 100 and the ambient environment external to autonomous vehicle 100. For example, perception subsystem 122 may use sensor data and navigation assistance data to perform imaging processing, object detection and recognition, object tracking, obstacle detection, distance measurement, motion detection, speed measurement, positioning, and the like.

Prediction subsystem 124 may use the status and information regarding autonomous vehicle 100 and the ambient environment external to autonomous vehicle 100 to make predictions, such as intents of pedestrians and trajectories of other objects. Prediction subsystem 124 may also use navigation assistance data 128 to determine locations of the vehicle and detected objects.

Based on the predictions of prediction subsystem 124, the status and information regarding autonomous vehicle 100 and the ambient environment, and navigation assistance data 128, planning and control subsystem 126 may make path planning, behavior decision, and trajectory generation. Planning and control subsystem 126 may also determine longitudinal controls (e.g., brake and throttle controls), lateral controls (e.g., steering controls, such as swerves or turns), and sequential controls (e.g., gear level, horn, and lamp controls).

Figure 2:
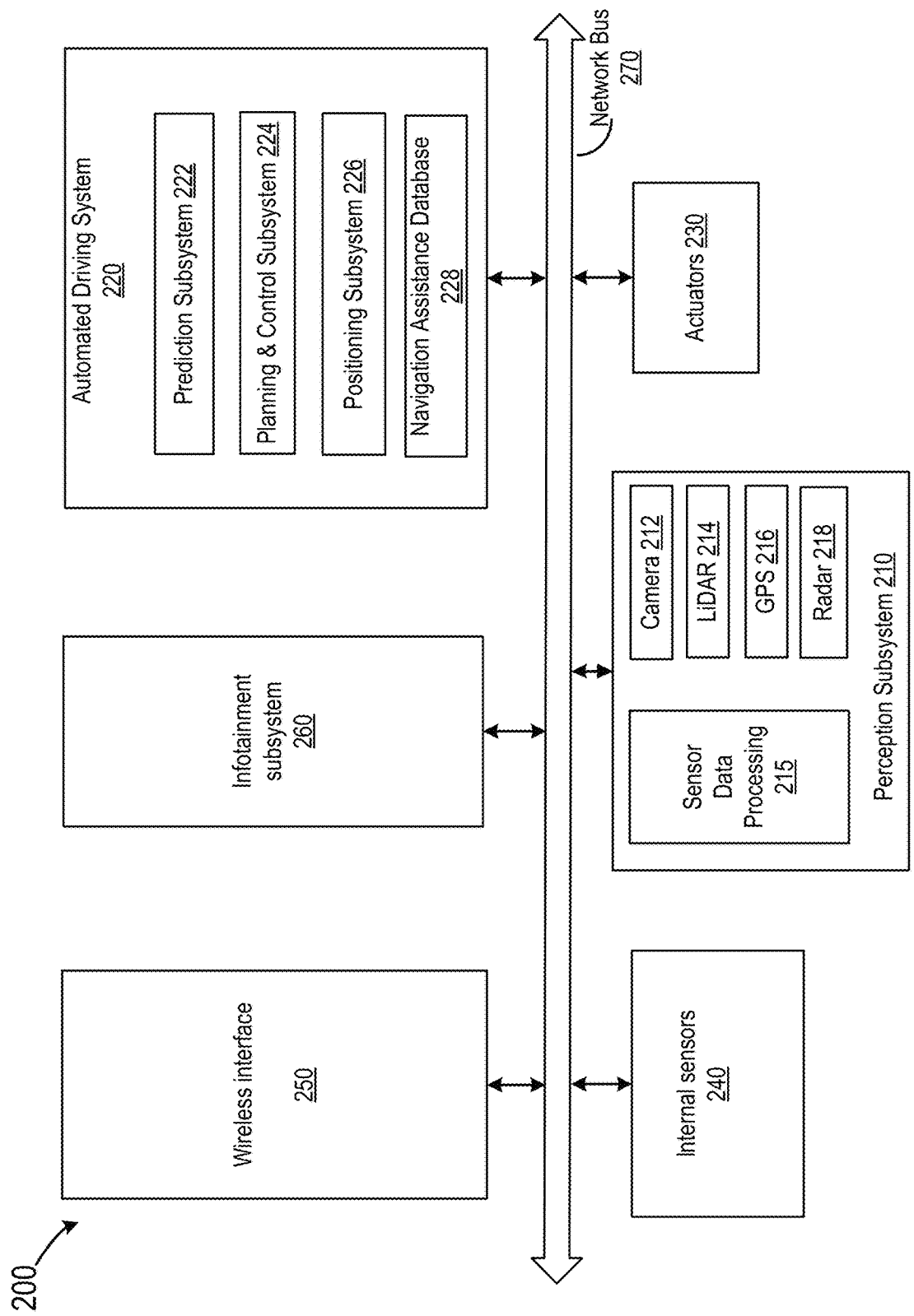
FIG. 2 is a simplified system block diagram including multiple subsystems in an autonomous vehicle according to certain embodiments.

FIG. 2 is a simplified system block diagram including multiple subsystems in an autonomous vehicle 200, according to certain embodiments. Autonomous vehicle 200 may be an example of autonomous vehicle 100. In the example shown in FIG. 2, autonomous vehicle 200 may include a perception subsystem 210 that includes hardware, software, and/or firmware for determining status and information of autonomous vehicle 200 and the surrounding environment. Autonomous vehicle 200 may also include an automated driving system 220, actuators 230, internal sensors 240, a wireless interface 250, and an infotainment subsystem 260. The different subsystems may communicate via a network bus 270, such as a Controller Area Network (CAN) bus.

Perception subsystem 210 of autonomous vehicle 200 may include a plurality of sensors at various locations. The plurality of sensors may include, for example, one or more cameras 212, one or more LiDARs 214, a GNSS receiver (e.g., a GPS receiver 216), radars 218 (e.g., short- and long-range radars), and other sensors, such as ultrasonic sensors, motion sensors or IMUS (e.g., an accelerometer and/or a gyroscope), a wheel sensor (e.g., a steering angle sensor or rotation sensor), and the like. Each of these sensors may generate signals that provide information relating to autonomous vehicle 200 and/or the surrounding environment. Each of the sensors described in connection with FIG. 2 may send and/or receive signals (e.g., signals broadcast into the surrounding environment and signals returned from the surrounding environment) that can be processed to determine attributes of features (e.g., objects) in the surrounding environment. Perception subsystem 210 may also include a sensor data processing unit 215, which may receive data from the sensors and perform various functions, such as object detections, obstacle detection, motion detection, ranging, location determination, and the like.

Cameras 212 may be used to provide visual information related to autonomous vehicle 200 and/or its surroundings, for example, for parking assistance, traffic sign recognition, pedestrian detection, lane markings detection and lane departure warning, surround view, and the like. Cameras 212 may include a wide-angle lens, such as a fisheye lens that can provide a large (e.g., larger than 150°) angle of view. Multiple cameras may provide multiple views that can be digitally "stitched" together to form an aggregated view. For example, images from cameras located at each side of autonomous vehicle 200 can be stitched together to form a 360° view of the vehicle and/or its surrounding environment. In certain embodiments, the 360° view may be provided from an overhead perspective, such as a perspective looking down on the vehicle at a 45° angle. In some embodiments, cameras 212 may be used to capture images of an object from different perspectives (view angles) to determine a distance of the object from vehicle 200. In some embodiments, cameras 212 may be used to capture a sequence of images of the surrounding environment, which may be used to identify a person in the surrounding. For example, sensor data processing unit 215 may use an image processing algorithm to determine whether the sequence of images include a person or another object. The sequence of images may also be used to determine a motion and/or an intent of the person detected in the surrounding environment. For example, sensor data processing unit 215 may identify a passenger seating on a bench from the captured images. This information may further help in determining the intent of the passenger.

LiDARs 214 may emit infrared laser light that can be used to detect objects (e.g., people, structures, and/or other vehicles) in the surrounding environment, for example, for emergency braking, pedestrian detection, or collision avoidance. In some embodiments, LiDARs 214 may be used to determine speeds, positions (including distances), and/or other attributes of the objects. LiDARs 214 may be located on, for example, a top or bottom portion of autonomous vehicle 200.

Radars 218 may emit radio frequency waves that can be used to detect objects (e.g., people, structures, and/or other vehicles) in the surrounding environment. In some embodiments, the radio frequency waves may be used to determine speeds, positions (including distances), and/or other attributes of the objects. Radars 218 may be an automotive radar or a Doppler radar for detecting movements of an object in its field of view. Radars 218 may be located at, for example, a corner of the front bumper, the front fascia, or the rear portions of autonomous vehicle 200. Radars 218 may include long-range radars, medium-range radars, and/or short-range radars, and may be used, for example, for blind spot detection, rear collision warning, cross traffic alert, adaptive cruise control, and the like.

The GNSS receiver (e.g., GPS receiver 216) may be used to determine at least one of the absolute location or the relative location of autonomous vehicle 200. The GNSS receiver may include, for example, a receiver that can receive broadcast signals from GNSS satellites, such as satellites for the Global Position System (GPS in United States), Galileo (European Union), Glonass (Russia), Compass, Quasi-Zenith Satellite System (QZSS) over Japan, Indian Regional Navigational Satellite System (IRNSS) over India, Beidou over China, or the like. The GNSS receiver may determine the absolute position and velocity of autonomous vehicle 200 by processing the signals broadcasted by satellites. The GNSS receiver may continuously acquire and track the signals from the satellites in view, and compute its distance to a set of satellites based on the speed of the electromagnetic wave (e.g., speed of light) and the propagation time (e.g., time-of-flight) of the incoming signals travelling through space that may be determined using the satellite and receiver local clocks. The calculated distance may be a rough estimate of the true range between satellite and a vehicle, and may need to be corrected to account for various errors to determine a precise measurement of the true distance. For example, the GNSS receiver may use various augmentation systems (e.g., a Satellite Based Augmentation System (SBAS)) that may be associated with or otherwise enabled for use with one or more global and/or regional navigation satellite systems to determine a more accurate location of autonomous vehicle 200.

Even though not shown in FIG. 2, autonomous vehicle 200 may also include an array of ultrasonic sensors located at, for example, the front, the driver side, the passenger side, and/or the rear bumper of autonomous vehicle 200. The ultrasonic sensors may emit ultrasonic waves that can be used to detect objects (e.g., people, structures, and/or other vehicles) in the surrounding environment. In some embodiments, vehicle control system 102 may also use the ultrasonic waves to determine speeds, positions (including distances), and/or other attributes of the objects relative to autonomous vehicle 200. The ultrasonic sensors may also be used, for example, for parking assistance.

Autonomous vehicle 200 may also include an IMU that may measure the speed, linear acceleration or deceleration, angular acceleration or deceleration, or other parameters related to the motion of autonomous vehicle 200. Autonomous vehicle 200 may further include, for example, a steering angle sensor that measures the steering wheel position angle and rate of turn, a rotary speed sensor that measures wheel rotation speed, or another wheel speed sensor.

Each of the aforementioned sensors, alone or in combination with one or more other sensors, may be used to implement various features of a vehicle control system. Examples of such features include, without limitation, generation of data associated with a visual representation, blind spot detection, collision warning, parking assistance, autonomous emergency braking, and other automated driving functions. In some embodiments, the sensor data may be processed locally within a sensor capturing the sensor data. Additionally or alternatively, the sensor data may be processed by sensor data processing unit 215, which may include one or more processors (e.g., in ECUs) and corresponding software. In some embodiments, some sensor data may be communicated to a remote computer system where data processing and feature extraction may be performed. The data processing and feature extraction (e.g., object detection, classification, or recognition) may be performed based on, for example, computer vision techniques or machine learning models, such as neural networks. In certain embodiments, some sensor data may be combined (e.g., through sensor fusion) to implement various automated driving features and other features of autonomous vehicle 200. In one example, sensor data processing unit 215 may process data gathered from these sensors (e.g., camera 212, LiDAR 214, GPS receiver 216, and radar 218) and generate tracking data. The tracking data may include, for example, a distance from autonomous vehicle 200 to a stationary or moving object, one or more images of the surrounding environment, classifications of objects in the surrounding environment, trajectory of moving objects, and the like.

In some embodiments, autonomous vehicle 200 may also include multiple internal sensors 240, such as a hood sensor, a door sensor, a speed sensor, a light sensor, and the like. These sensors may be attached to components, such as hood, door, or speedometer, and may be housed within autonomous vehicle 200.

Autonomous vehicle 200 may include an automated driving system 220 for navigating and controlling the autonomous vehicle on the road without or with minimum user input. Automated driving system 220 may include a prediction subsystem 222, a planning and control subsystem 224, a positioning subsystem 226, and a navigation assistance database 228. Prediction subsystem 222 may predict an outside environment surrounding the vehicle in order for the planning and control subsystem 224 to plan route and motion control for autonomous vehicle 200. In some embodiments, prediction subsystem 222 may predict an intention of an object detected in the surrounding environment of autonomous vehicle 200. The intention of the object may be a predicted future action of the object. The predicted intention of the object may be used to predict a probability of an imminent collision of autonomous vehicle 200 with the object. Planning and control subsystem 224 may make path planning, behavior decision, and trajectory generation. For example, planning and control subsystem 224 may determine longitudinal controls (e.g., brake and throttle controls), lateral controls (e.g., steering controls, such as swerves or turns), and sequential controls (e.g., gear level, horn, and lamp controls).

In some embodiments, in order to avoid a potential collision, prediction subsystem 222 of automated driving system 220 may amplify the actual speed or the estimated trajectory (e.g., the travel distance in a given time period) of a moving object. For example, based on the speed and moving direction of a moving object determined by perception subsystem 210, prediction subsystem 222 may amplify the speed of the moving object by a certain number of times (e.g., 10 times or higher) in order to predict the trajectory of the moving object and determine the actions to take by autonomous vehicle 200. In one example, if the speed of a pedestrian is determined to be 1 meter per second (m/s), prediction subsystem 222 may determine the trajectory of the pedestrian based on a speed of 11 m/s. As such, the projected distance of a potential impact from the tracked object may be amplified by 11 times. Based on the predictions made using the amplified speed or travel distance, planning and control subsystem 224 may take more aggressive preventive actions in order to avoid potential collision. For example, planning and control subsystem 224 may brake early, make a harder brake to decelerate faster, or completely stop the vehicle, when an object moves towards autonomous vehicle 200 at a certain speed.

Navigation assistance database 228 may include a high definition map for one or more regions. The high definition map may include various information regarding the one or more regions, including street information, points or areas of interest, information of buildings and other structures, and the like. Navigation assistance database 228 may be used by prediction subsystem 222, planning and control subsystem 224, and positioning subsystem 226.

Positioning subsystem 226 may use GPS data and navigation assistance database 228 to determine position of autonomous vehicle 200 and/or positions of objects near autonomous vehicle 200 (e.g., based on relative locations of the objects with respect to autonomous vehicle 200). For example, positioning subsystem 226 may determine the position of autonomous vehicle 200 using a GPS receiver. Positioning subsystem 226 may determine a location of an object in the surrounding environment based on the location of autonomous vehicle 200 and the distance and bearing information of the object from autonomous vehicle 200. In one example, positioning subsystem 226 may use data such as the distance of a moving object from autonomous vehicle 200, the velocity of the moving object, the bearing (direction) of the movement, and other data along with the position of autonomous vehicle 200 to determine coordinates (e.g., longitude and latitude coordinates) of the moving object.

Actuators 230 may be controlled by automated driving system 220 (e.g., planning and control subsystem 224) to physically perform actions such as applying brakes and steering. Planning and control subsystem 224 may also transmit the control decisions to infotainment subsystem 260 for output. For example, infotainment subsystem 260 may provide navigation outputs (e.g., audio and/or video feedback) to drivers to let them know the location of the vehicle and which direction the vehicle is heading.

A wireless interface 250 may be used to perform long-range and short-range communication to support safety and security management operations, and other operations, such as remote control operations. For example, wireless interface 250 may include a long-range communication interface, such as a cellular transceiver, to transmit operation data (e.g., collected by perception subsystem 210) to a remote management server, and to receive instructions from the remote management server to enable or disable accesses to various components of autonomous vehicle 200 and/or to receive instructions for remotely controlling the operation of various subsystems of autonomous vehicle 200.

FIG. 3 illustrates an example of an autonomous vehicle 330 passing by a bus stop zone 310 with passengers waiting at the bus stop in an example environment 300. In the illustrated example, bus stop zone 310 may be close to a vehicle traffic lane. Passengers 320 and 322 may be waiting for a bus or another vehicle at bus stop zone 310. Passenger 320 may move around within the area of bus stop zone 310, while passenger 322 may be stationary.

As discussed above, an autonomous vehicle, such as autonomous vehicle 330, may have one or more sensors configured to detect objects (e.g., people) in a surrounding environment of the vehicle. When the perception subsystem of the autonomous vehicle detects an object in the surrounding environment of the vehicle, the prediction subsystem of the autonomous vehicle may react in response to the detection of the object, even if the object does not intend or is not likely to enter the pathway of the autonomous vehicle. For example, when a pedestrian or another object is detected and determined to be close to the autonomous vehicle's predicted or planned trajectory, the prediction subsystem and the planning and control subsystem may cause the vehicle to swerve or laterally shift to make a trajectory adjustment in order to move away from the object. When a pedestrian or another object is detected in the surrounding environment of the autonomous vehicle and is determined to move, the prediction subsystem and the planning and control subsystem may amplify the projected movement of the object and cause the autonomous vehicle to make a hard braking action or a complete stop to avoid a potential collision, whether the moving object would enter the vehicle's pathway or not. For example, a person near a crosswalk is likely to enter the road and thus the vehicle may need to make a hard braking action or a complete stop to avoid potential collision with the person.

In contrast, in certain areas of a street, such as a bus stop or an area in front of a store, stationary humans or humans making small movements are unlikely to veer out into the road. In these areas, even though some pedestrians may move relatively close to the autonomous vehicle, the probability of a collision may be low. For example, as shown in FIG. 3, in a public transport stop area, such as a bus stop zone 310, waiting passengers (e.g., passenger 320 and 322) are expected to be within the area. When autonomous vehicle 330 passing by bus stop zone 310 detects passenger 320 standing in bus stop zone 310, autonomous vehicle 330 may not need to make a hard braking action or a sudden swerve because passenger 320 is waiting for a bus or another car at bus stop zone 310. Even though passenger 320 may be close to the vehicle traffic lane and/or may be moving slightly, the probability of passenger 320 entering the vehicle traffic lane to collide with autonomous vehicle 330 is very low. Thus, no corrective object avoidance action may be performed in such instances. However, in some embodiments, autonomous vehicle 330 may still operate using the normal collision avoidance response procedure, where autonomous vehicle 330 may swerve or shift laterally to make a trajectory adjustment in order to move away from passenger 320 or may make hard brakes or a complete stop to avoid a collision with passenger 320. For example, autonomous vehicle 330 may shift laterally towards vehicle 332 that may be in an adjacent lane.

FIG. 4 illustrates an example of a vehicle 410 responding to pedestrians 420 at a bus stop zone 430. In the illustrated example, vehicle 410 may pass by bus stop zone 430, which may be next to the lane that vehicle 410 is in. Multiple pedestrians 420 may be in bus stop zone 430. Pedestrians 420 may be stationary or may move slightly or at a low speed within bus stop zone 430. Vehicle 410 may detect pedestrians 420 and/or the motions (e.g., walking, pacing, fidgeting, etc.) of one or more pedestrians 420.

According to the normal collision avoidance response procedure (also referred to as the "conventional," "default," "conservative," or "standard" collision response procedure), vehicle 410 may amplify the motion of any moving pedestrian and take preventive actions to avoid any potential collision. For example, when a pedestrian 420 sees vehicle 410 approaching, the pedestrian 420 may move (e.g., turn around), and vehicle 410 may amplify the movement of pedestrian 420 and make a hard brake or a complete stop, which may cause uncomfortableness or injury to passengers in vehicle 410. Additionally, vehicle 410 may detect a pedestrian 420 that is very close to vehicle 410's planned trajectory (e.g., the vehicle traffic lane), and thus may move laterally to avoid a potential collision with the pedestrian, which may cause vehicle 410 to be too close to a vehicle in the adjacent lane.

FIG. 5 illustrates another example of a vehicle 510 responding to a pedestrian 520 at a bus stop. In the illustrated example, vehicle 510 may pass by a bus stop, which may be next to the lane that vehicle 510 is in. Pedestrian 520 may be in the bus stop. Pedestrian 520 may be stationary or may move slightly or at a low speed within the bus stop zone. Vehicle 510 may detect pedestrian 520 and/or motions of pedestrian 520. According to the normal collision avoidance response procedure, when vehicle 510 detect pedestrian 520 that is close to vehicle 510's planned trajectory, vehicle 510 may predict that pedestrian 520 may move in any possible direction (free roaming), including a direction towards vehicle 510. Thus, vehicle 510 may move laterally (also referred to as "nudge") to avoid a potential collision with pedestrian 520 even though pedestrian 520 may not enter the pathway of vehicle 510 at all, which may cause vehicle 510 to be too close to a vehicle 512 in the adjacent lane or even collide with vehicle 512.

As shown by FIGS. 4 and 5, an autonomous vehicle that uses a same collision avoidance response procedure may have difficulty travelling smoothly in certain areas, such as a bus stop zone, a school zone, a loading zone, or a commercial district, because the autonomous vehicle may try to move away from the pedestrians and a small movement of a pedestrian may have a large impact on the driving behavior of the autonomous vehicle (also referred to as "user experience," "driver experience," and "driving efficiency").

For example, the autonomous vehicle may swerve or shift laterally away from the pedestrian. The autonomous vehicle may react to the small movement of a pedestrian with a brake tap (light brake) or brake jab (harsh brake) because the pedestrian would be predicted to more in various heading directions, including intruding into the autonomous vehicle's planned trajectory. Continuous brake reactions may slow down the traveling speed of the autonomous vehicle, or may even cause a complete stop of the autonomous vehicle when there are many pedestrians in the bus stop and many different movements of the pedestrians.

According to certain embodiments, an autonomous vehicle may operate using different collision avoidance response procedures in different areas, where the collision avoidance response procedure may be dynamically switched based on the classification of the area in the surrounding environment. For example, the autonomous vehicle may react to a pedestrian detected at a bus stop or a similar area in a manner different from how it would respond to a pedestrian detected in other areas where the pedestrian may likely enter the vehicle traffic lanes. As described above, the autonomous vehicle may detect one or more objects in the surrounding environment based on sensor data. Upon detection of an object, the vehicle control system of the autonomous vehicle may determine the location of the object, classify the location of the object, and then operate the autonomous vehicle according to an appropriate collision avoidance response procedure based on the classification result of the location of the detected object. For example, if the detected object is determined to be in an area where a pedestrian may likely enter the vehicle traffic lanes, such as an intersection or most areas next to a street, the vehicle control system of the autonomous vehicle may operate according to a conservative collision avoidance response procedure, where the speed or predicted travel distance of a moving object may be amplified when determining the preventive actions to take by the vehicle to avoid potential collisions. On the other hand, if the detected object is determined to be in an area where pedestrians may be present but may not be expected to move into the pathways of the vehicle, such as a bus stop, a loading zone, or another waiting area, the vehicle control system of the autonomous vehicle may operate in a cautious mode (e.g., at a low but relatively constant speed), while ignoring the detected object (e.g., a pedestrian). As a result, the vehicle may reduce or avoid unnecessary brakes, stops, or swerves, while still avoiding any potential collisions with pedestrians. In the context presented herein, ignoring the detected object does not necessarily mean to forego continuing the tracking of the object; rather, ignoring the detected object can mean to forego making consequential adjustments to a trajectory in response to detected movements of the object, as described above.

Figure 6:
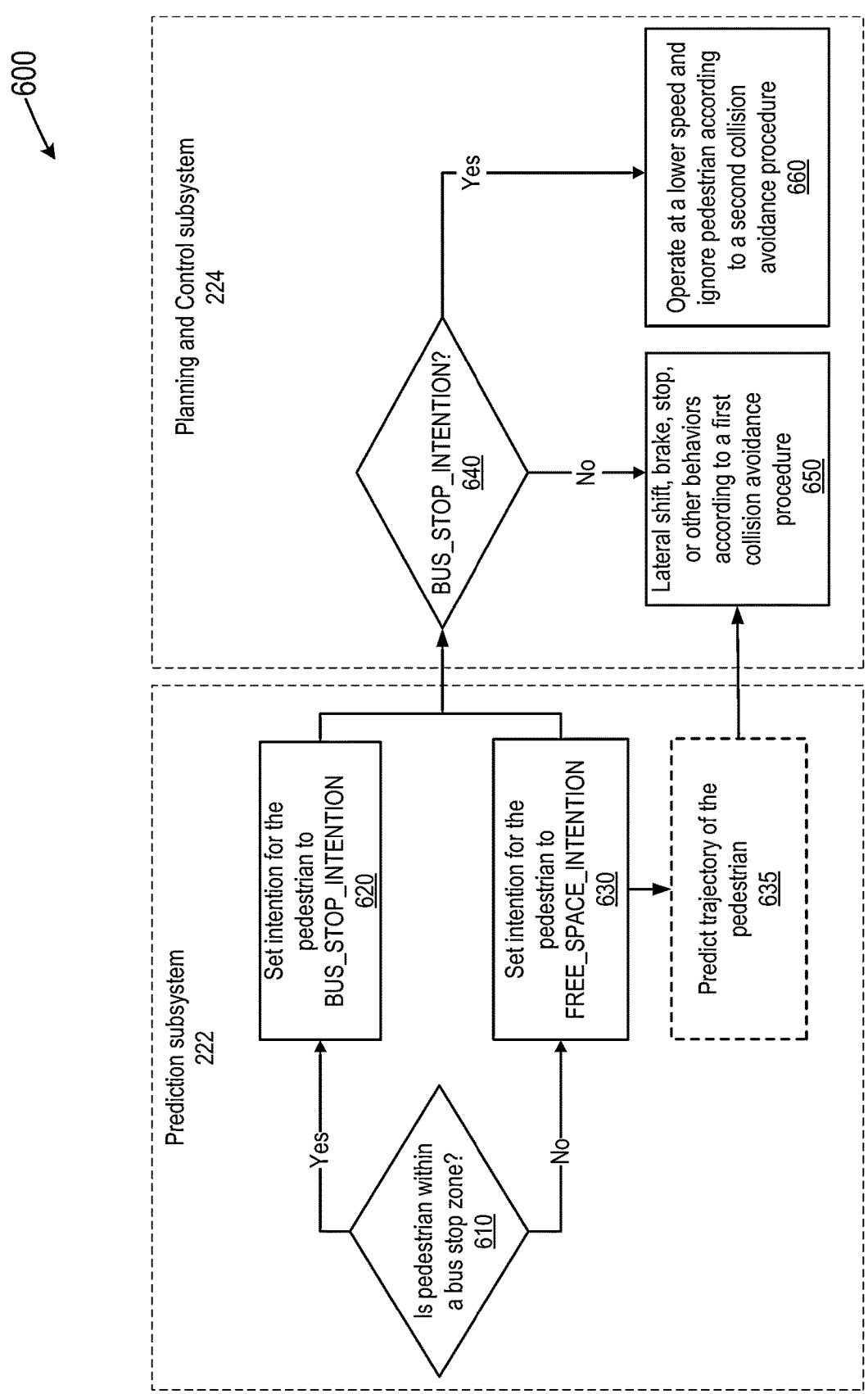
FIG. 6 includes a flowchart illustrating example operations of a vehicle according to certain embodiments.

FIG. 6 includes a flowchart 600 illustrating example operations of an autonomous vehicle according to certain embodiments. At block 610, a prediction subsystem (e.g., prediction subsystem 222) may determine, based on tracking data provided by a perception subsystem (e.g., perception subsystem 210) and navigation assistance data (e.g., in navigation assistance database 228), whether a pedestrian detected by the perception system is in a bus stop zone. For example, the perception subsystem or the prediction subsystem may determine the coordinates of the pedestrian, for example, based on the coordinates of the autonomous vehicle (e.g., determined using a GPS receiver) and the relative location of the pedestrian with respect to the autonomous vehicle (e.g., determined using cameras, LiDARs, Radars, ultrasonic sensors, etc.). The navigation assistance data may include a high definition map that indicates various types of zones or points of interest in the surrounding environment, such as a school zone, a shopping area, a parking lot, a bus stop or another public transportation area, or the like, and the corresponding coordinates of the boundaries of the zones. Thus, based on the coordinates of the pedestrian and the corresponding coordinates of the boundaries of the different zones, the prediction subsystem may determine whether the pedestrian is in a special zone, such as a bus stop zone. If it is determined that the pedestrian is not in a bus stop zone, the prediction subsystem may output a prediction result indicating that the pedestrian is not in the bus stop zone; otherwise, the prediction subsystem may output a prediction result indicating that the pedestrian is in a bus stop zone.

At block 620, based on the prediction result indicating that the pedestrian is in a bus stop zone, the prediction subsystem may set the intention for the pedestrian to BUS_STOP_INTENTION. At block 630, based on the prediction result indicating that the pedestrian is not in the bus stop zone, the prediction subsystem may set the intention for the pedestrian to FREE_SPACE_INTENTION (e.g., free roaming). Optionally, when the intention for the pedestrian is set to FREE_SPACE_INTENTION, the prediction subsystem may predict the trajectory of the pedestrian at block 635 if the pedestrian is determined to be moving. As described above, the prediction subsystem may amplify the speed or the projected distance of the impact from the detected object when making the prediction.

At block 640, the planning and control subsystem (e.g., planning and control subsystem 224) may receive the predicted intention for the pedestrian from the prediction subsystem. The planning and control subsystem may determine whether the predicted intent for the pedestrian is BUS_STOP_INTENTION. If the predicted intention for the pedestrian is not BUS_STOP_INTENTION, the pedestrian is not in a bus stop zone. The planning and control subsystem may perform a first collision avoidance response procedure at block 650, where the planning and control subsystem may determine the preventive actions to take to avoid potential collisions with the pedestrian, based on, for example, the predicted trajectory of the pedestrian determined by the prediction subsystem at block 635. As described above, the planning and control subsystem may decide to swerve or move laterally to avoid the pedestrian if the pedestrian is too close to the planned trajectory of the vehicle. The planning and control subsystem may also decide to adjust the longitudinal motion of the vehicle, such as making brakes or a complete stop, when motions of one or more pedestrians are detected.

If the predicted intention for the pedestrian is BUS_STOP_INTENTION, the pedestrian is at a bus stop zone. The planning and control subsystem may perform a second collision avoidance response procedure at block 660, where the planning and control subsystem may, for example, operate the vehicle at a lower but more steady speed, while ignoring the pedestrian as along as the pedestrian is in the bus stop zone. The lower speed may help to ensure that the vehicle would have sufficient time to react in case the pedestrian is out of the bus stop zone. If the pedestrian is out of the bus stop zone, the prediction result at block 610 would change and the intention for the pedestrian would be set to FREE_SPACE_INTENTION at block 630, and the first collision avoidance response procedure would be used.

Figure 7:
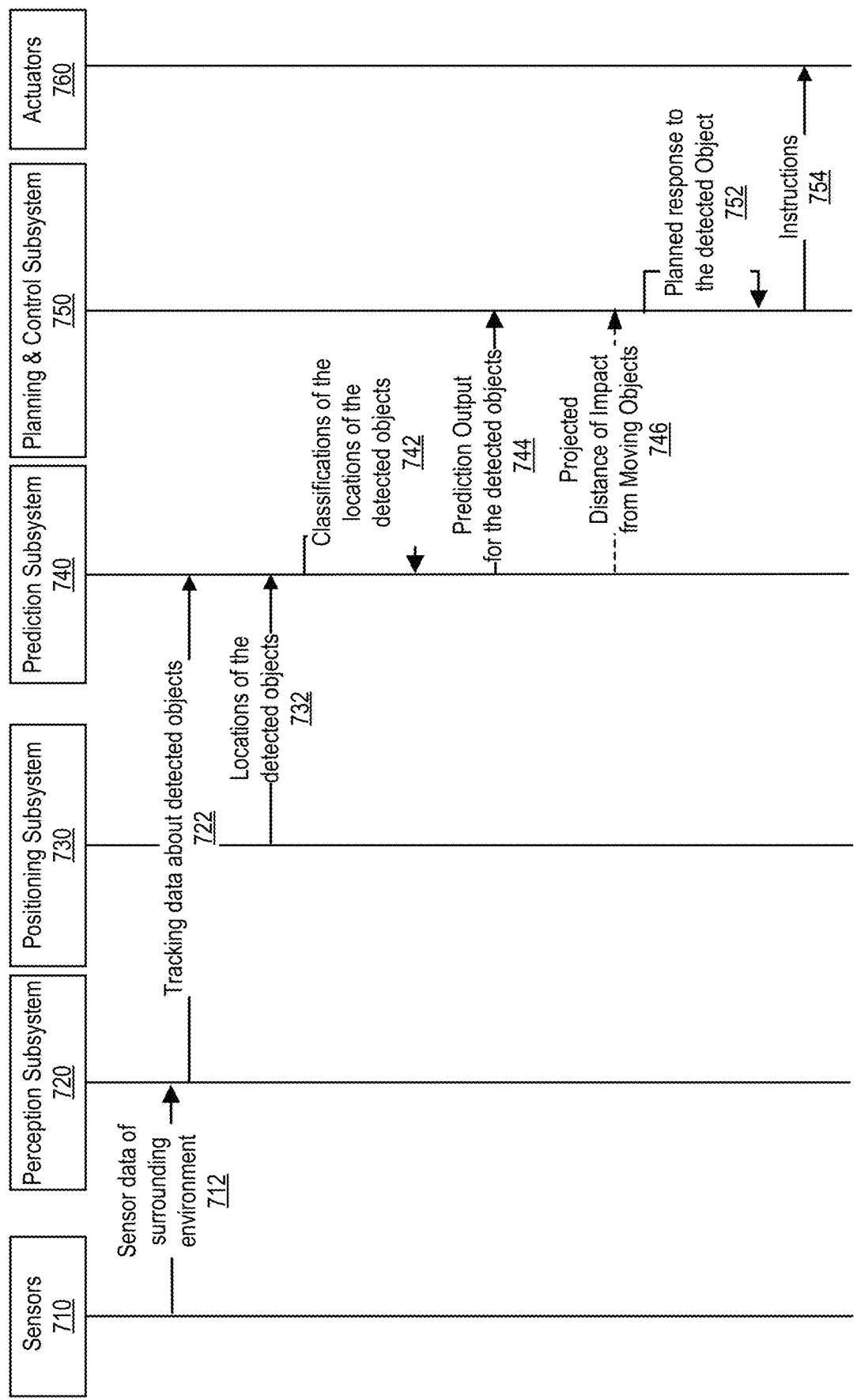
FIG. 7 illustrates examples of operations performed by various subsystems of an autonomous vehicle to dynamically adjust the collision avoidance response procedure according to certain embodiments.

FIG. 7 illustrates examples of operations performed by various subsystems of an autonomous vehicle to dynamically adjust the collision avoidance response procedure. As described above, the various subsystems may include sensor 710 (e.g., cameras 212, LiDARs 214, GPS receiver 216, radars 218, etc.), perception subsystem 720 (e.g., perception subsystem 122 or perception subsystem 210), positioning subsystem 730 (e.g., positioning subsystem 226), prediction subsystem 740 (e.g., prediction subsystem 124 or 222), planning and control subsystem 750 (e.g., planning and control subsystem 126 or 224), and actuators 760 (e.g., actuators 116 or 230).

As discussed above, sensors 710, such as cameras, radars, and LiDARs, may be used to identify pedestrians or other objects in the surrounding environment of the vehicle. Sensors 710 may send sensor data 712 (e.g., raw tracking data) to perception subsystem 720. Perception subsystem 720 may process the sensor data, identify objects, detect motions of the objects, determine distances to the detected objects, and the like. Perception subsystem 720 may send tracking data 722 associated with the identified objects to prediction subsystem 740. Positioning subsystem 730 (and/or perception subsystem 720) may determine the locations of the detected objects as described above and send the location information of the detected objects 732 to prediction subsystem 740. For example, positioning subsystem 730 may retrieve position of the vehicle using a GPS receiver. Positioning subsystem 730 may use the tracking data from perception subsystem 720 to determine the locations of the detected objects with respect to the vehicle. In one example, positioning subsystem 730 may use tracking data, such as a distance of an object from the vehicle, velocity of a moving object, direction of the movement, and other data along with the position of vehicle to determine coordinates of the object.

Prediction subsystem 740 may classify the locations of the detected objects based on the locations of the detected object and a map indicating different zones or areas of interest. The classifications 742 of the locations of the detected objects may indicate whether the detected objects are in some special zones (e.g., classified zones) where pedestrians are unlikely to enter the vehicle traffic lanes, such as bus stops, school zones, loading zones, and the like. Prediction subsystem 740 may set the predicted intention 744 for an object (e.g., pedestrian) that is not within a special zone (e.g., a bus stop) to a first intention (e.g., FREE_SPACE_INTENTION), and may set the predicted intention 744 for an object that is within a special zone to a second intention (e.g., BUS_STOP_INTENTION). Prediction subsystem 740 may send the predicted intention 744 to planning and control subsystem 750. When a moving object is detected in the surrounding environment, prediction subsystem 740 may predict future interactions or intentions of the moving object, such as predicted trajectory of (or imminent collision with) the moving object. As described above, prediction subsystem 740 may make the prediction by amplifying the speed of the moving object or the projected distance of the impact from the moving object. For example, prediction subsystem 740 may send projected distance of impact 746 from the moving object to planning and control subsystem 750.

Planning and control subsystem 750 may determine the planned response 752 to the detected object based on the predicted intention 744 for the detected object, navigation assistance data (e.g., a map), the projected distance of impact 746 from the moving object, and/or the tracking data about the detected objects, as described above with respect to, for example, FIG. 6 and described below with respect to, for example, FIG. 8. Based on the planned response, planning and control subsystem 750 may send instructions 754 to actuators 760 for controlling the vehicle to take preventive actions.

Figure 8:
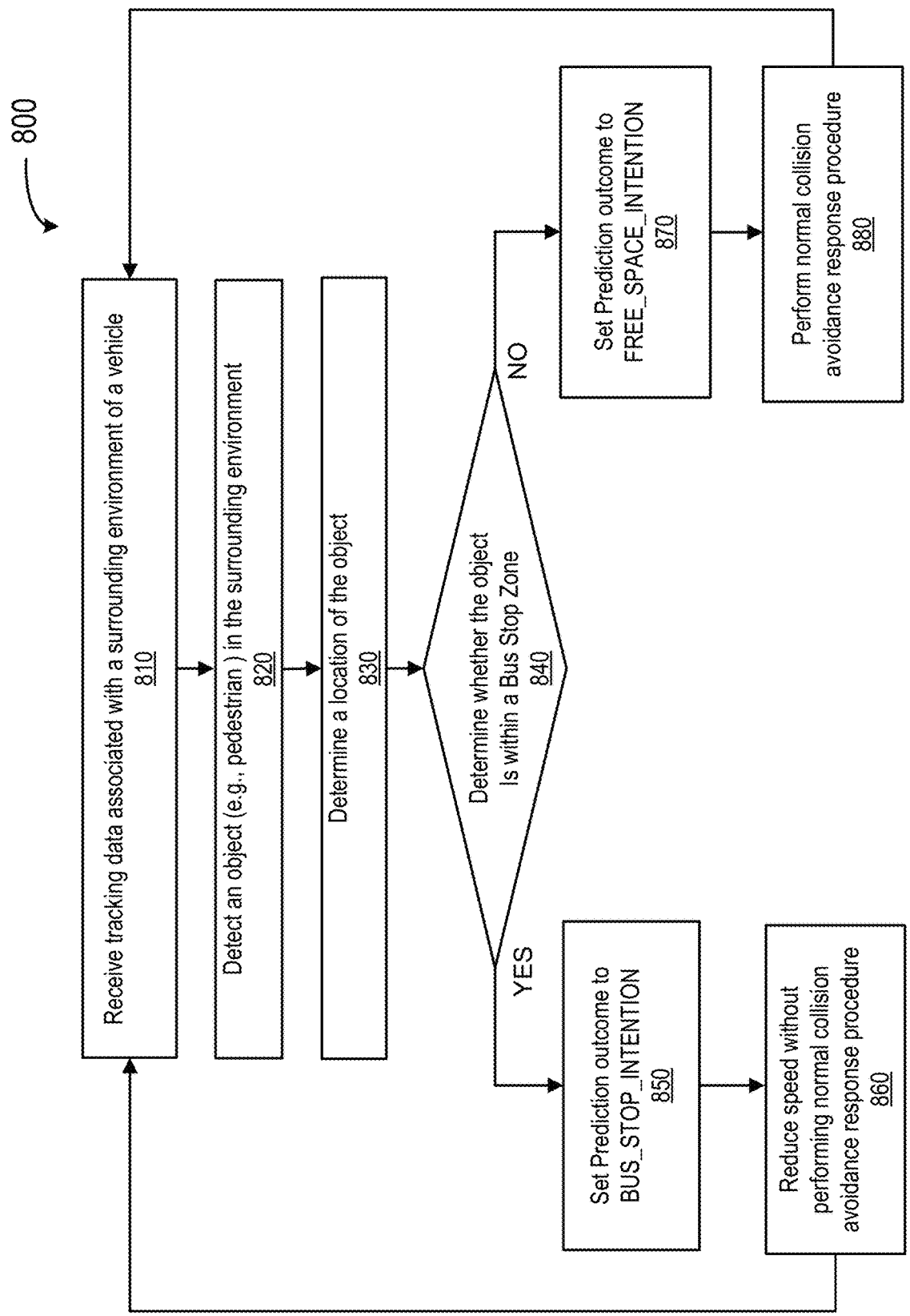
FIG. 8 is a flowchart illustrating example operations of a vehicle according to certain embodiments.

FIG. 8 is a flowchart 800 illustrating example operations of a vehicle according to certain embodiments. Although FIG. 8 may describe the operations as a sequential process, many of the operations may be performed in parallel or concurrently. In addition, the order of the operations may be rearranged. An operation may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. One or more processors or ECUs may perform the associated tasks (operations). For example, some of the operations may be performed by a perception subsystem, a prediction subsystem, and/or a planning and control subsystem described above.

At operation 810, one or more processors in a vehicle, such as autonomous vehicle 100 or 200, may receive tracking data associated with a surrounding environment of the vehicle. As described above, the tracking data may be collected by one or more sensors on the vehicle, such as sensors 114, one or more cameras 212, one or more LiDARs 214, GPS receiver 216, one or more radars 218, and other sensors (e.g., IMUs, ultrasonic sensors, etc.), which may correspond to a surrounding environment. In some embodiments, the tracking data may be received from a remote server through wireless communication channels. The tracking data may include, for example, a distance from the vehicle to a stationary or moving object, one or more images of the surrounding environment, a speed and/or moving direction of a moving object, the trajectory of moving objects, and the like.

At operation 820, the one or more processors may detect an object in the surrounding environment of the vehicle. The object may include, for example, a stationary or moving person or another moving object. The object may be detected using computer vision techniques and/or machine learning techniques based on the tracking data, such as one or more images of the surrounding environment captured by cameras, LiDARs, radars, and the like, or motions associated with moving objects detected by LiDARs, radars, motion sensors, and the like.

At operation 830, the one or more processors may determine a location of the object. The location of the object may be determined, for example, based on a location of the vehicle and the relative position of the object with respect to the vehicle as described above. The location of the vehicle may be determined based on, for example, GPS data or wireless positioning techniques. The relative position of the object may be determined based on tracking data, such as LiDAR data, radar data, images captured by two or more cameras at different locations of the vehicle (and thus from different viewing angles). The location of the object may be represented by, for example, coordinates (latitude, longitude, and/or altitude), addresses, and the like. In some embodiments, the location may be a relative location with respect to the vehicle or another point of interest.

At operation 840, the one or more processors may determine whether the detected object is within a classified area (e.g., in the surrounding environment) where pedestrians are not expected to enter the vehicle traffic lanes, such as a bus stop zone, a loading zone, a storefront, and the like. The one or more processors may classify the location of the detected object based on navigation assistance data, such as a high definition map that indicates different types of areas or points of interest, such as bus stops or other public transport stop areas (e.g., taxi stop, automobile-for-hire (e.g., DiDi®), trolley stop, etc.), loading areas, school zones, parks, parking lots, businesses, and the like. For example, the high definition map may include coordinates of the boundaries of the areas of interest. Based on the coordinates of the detected object and the coordinates of the boundaries of the areas of interest in the map, the one or more processor may determine whether the detected object is within an area of interest.

At operation 850, in response to determining that the detected object is within a classified area, the one or more processors may initiate a first collision avoidance response procedure for responding to the detected object. The detected object can be completely within the classified area or at least partially within the classified area. In some aspects, determining whether the location of the object is at least partially within the classified area can include determining whether coordinates of the object are within or partially within a two-dimensional polygon in an area of a map corresponding to the surrounding environment of the vehicle. In any of these cases, the one or more processors may set a prediction outcome to BUS_STOP_INTENTION, as noted in the examples above, or other similar functional outcome, as would be appreciated by one of ordinary skill in the art with the benefit of this disclosure. At operation 860, the first collision avoidance response may include reducing the vehicle's speed or not changing the speed and/or trajectory at all (ignoring the object), without performing a normal collision avoidance response procedure (e.g., stopping, performing a sharp braking action, swerving or "nudging" into an adjacent lane, etc.).

At operation 870, in response to determining that the detected object is not within or partially within a classified area, the one or more processors may initiate a second collision avoidance response procedure for responding to the detected object. The detected object can be completely outside of the classified area or, in some embodiments, at least partially outside of the classified area. In such cases, the one or more processors may set a prediction outcome to FREE_SPACE_INTENTION, as noted in the examples above, or other similar functional outcome, as would be appreciated by one of ordinary skill in the art with the benefit of this disclosure. At operation 880, the second collision avoidance response may include a "normal" avoidance response procedure, and described above. Typically, the second collision avoidance procedure is different than the first collision avoidance procedure. In some aspects, the second collision avoidance response procedure can include: determining, based upon the tracking data, that the object is an moving object; determining, based upon the tracking data, a projected distance of impact from the moving object including an amplified distance of impact from the moving object; and operating the vehicle based on the projected distance of impact from the moving object, including at least one of steering the vehicle to laterally shift the vehicle away from the object, applying a brake to the vehicle to reduce a speed of the vehicle, or applying brakes to the vehicle to stop the vehicle. In some implementations, method 800 can include tracking the object and configuring, based on the location of the object during the tracking, the control system of the vehicle to perform at least one of: changing from the first collision avoidance response procedure to the second collision avoidance response procedure, or changing from the second collision avoidance response procedure to the first collision avoidance response procedure.

Figure 9:
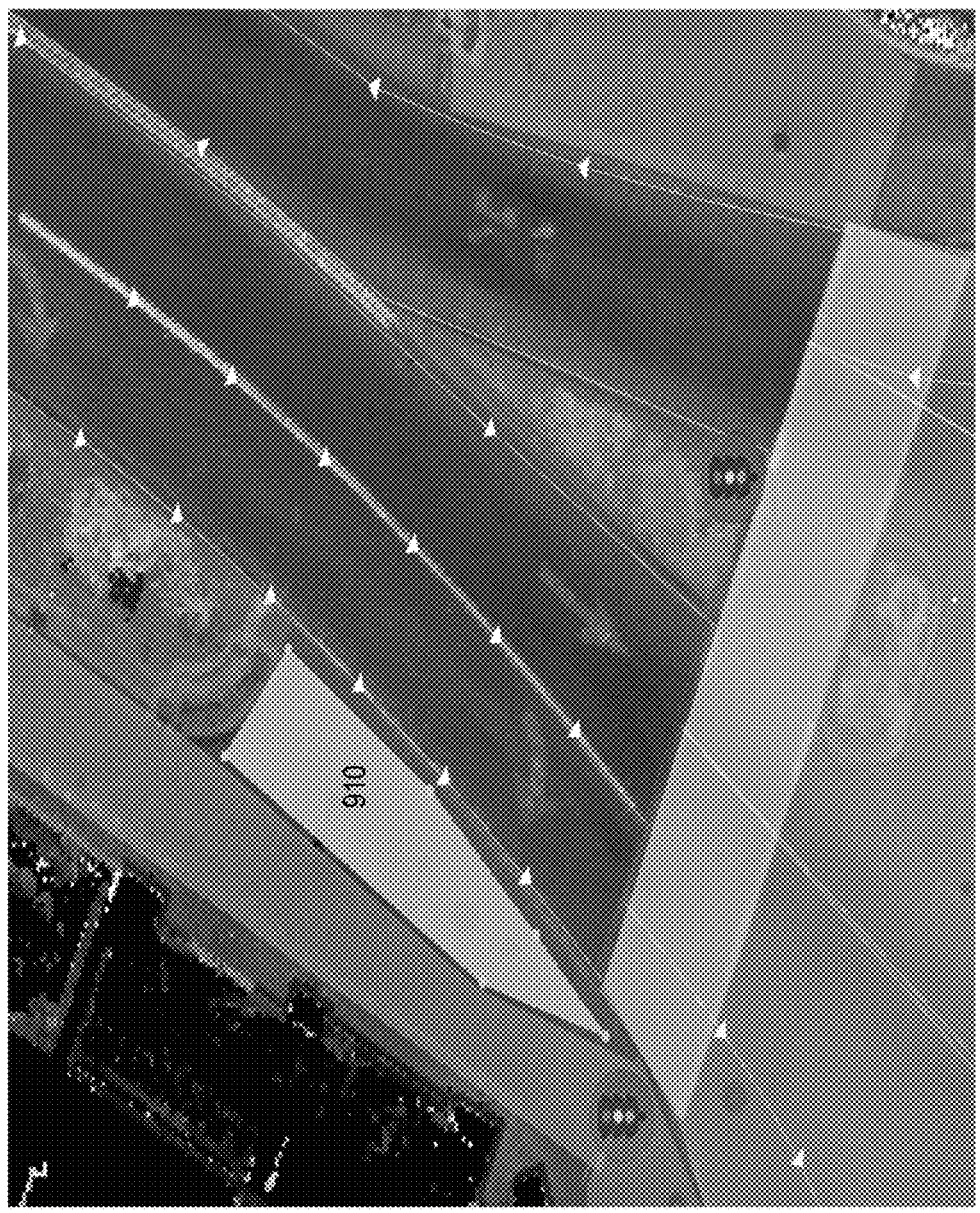
FIG. 9 illustrates an example of a map including an area corresponding to a bus stop zone according to certain embodiments.

FIG. 9 illustrates an example of a map 900 indicating an area corresponding to a bus stop. In the illustrated example, a two dimensional polygon 910 may be defined around a classified area (e.g., a bus stop, train-stop, school area, and another area where people may be present but may not be expected to enter vehicle traffic lanes) in map 900. The classified area may be a subset of an area defining the surrounding environment and may be defined by coordinates of the vertices of polygon 910.

The one or more processors may identify whether the detected object is within the classified area using the following pseudocode:

Bool IsInside2D (const Point& point, const Polygon& polygon), which returns whether a point lies inside a polygon. The polygon is a substantially flat polygon. In one implementation, the coordinates of the object are on the same plane as the polygon in order to be inside the polygon. In some embodiments, the 2-dimensional polygon may have holes. A point inside a hole may be considered to be outside the polygon. Thus, to determine whether the object is within a bus stop, the following pseudocode may be used:

```
bool IsInBusStop() {
    if (IsInside2d(PED.pose, BUS_STOP.border)) {
        return true;
    } else {
        return false;
    }
},
``` where PED.pos is the location of the object, and BUS_STOP.border is the polygon defining boundaries of the bus stop zone.

Referring back to FIG. 8, if the one or more processors determine that the detected object is within a classified zone, such as a bus stop zone, the one or more processors may set the prediction output to BUS_STOP_INTENTION for the detected object at operation 850 as described above; otherwise, the one or more processors may set the prediction output to FREE_SPACE_INTENTION for the detected object at operation 870.

In certain embodiments, when the prediction output for the detected object is set to FREE_SPACE_INTENTION, the one or more processors may control actuators of the vehicle to take a first collision avoidance response procedure at operation 880, where the planning and control subsystem may determine the actions to take to avoid potential collisions with the detected object, based on, for example, the predicted trajectory of the object as described above with respect to block 635. As described above, the one or more processors may determine to swerve or move laterally to avoid the object if the object is too close to the planned trajectory of the vehicle. The one or more processors may also determine to adjust the longitudinal motion of the vehicle, such as making brakes or stops, if motions of one or more pedestrians are detected.

When the prediction output for the detected object is set to BUS_STOP_INTENTION, the object is at a bus stop zone. The one or more processors may take a second collision avoidance response procedure in operation 860, where the one or more processors may, for example, operate the vehicle at a lower but more steady speed (without frequent brakes or a complete stop), while ignoring the detected object as along as the object is in the bus stop zone.

The lower speed may help to ensure that the vehicle could have sufficient time to react in case the object moves out of the bus stop zone. If the object moves out of the bus stop zone, the prediction result at operation 840 would change and the intention for the pedestrian would be set to FREE_SPACE_INTENTION at operation 870, and the first collision avoidance response procedure would be used at operation 880.

Figure 10:
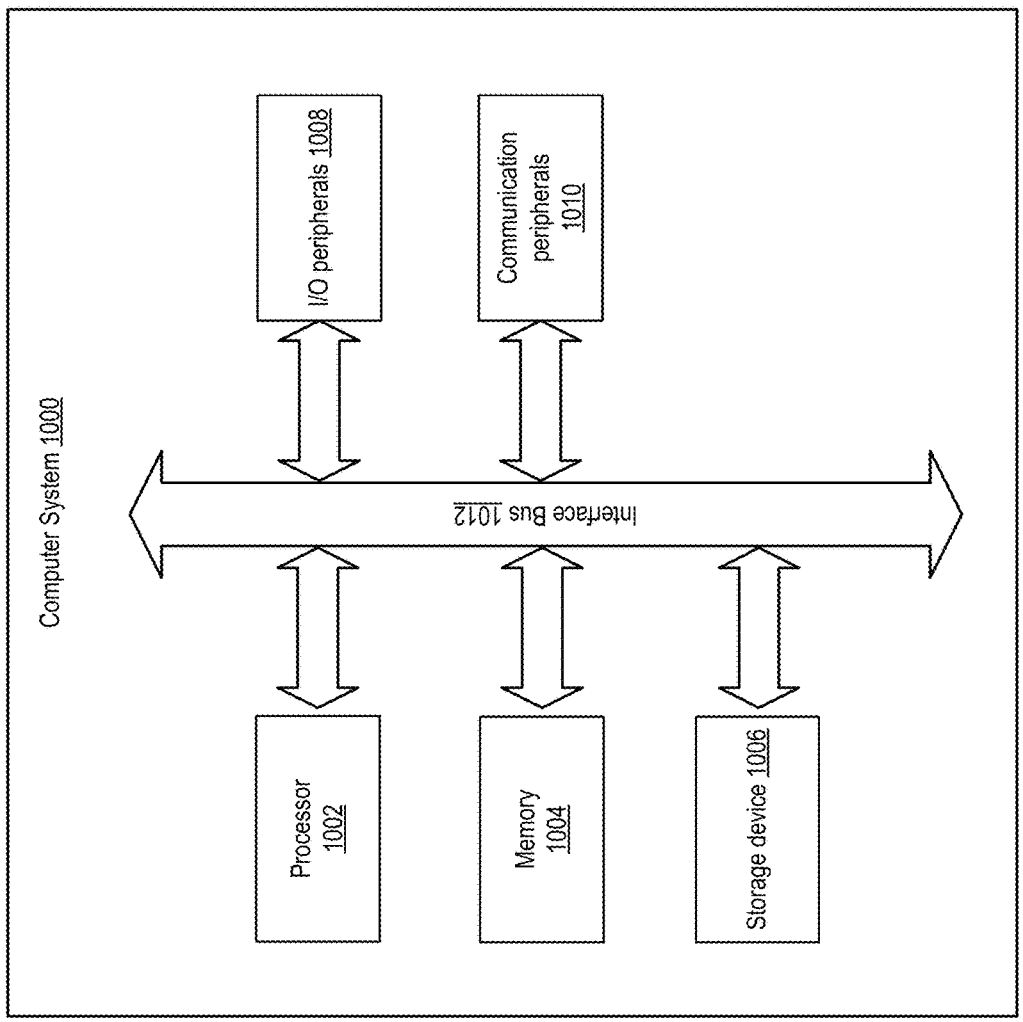
FIG. 10 is a simplified block diagram of an example of a computer system for implementing some techniques disclosed herein according to certain embodiments.

FIG. 10 illustrates an example computer system 1000 for implementing some of the embodiments disclosed herein. For example, computer system 1000 may be used to implement any of the perception subsystem, prediction subsystem, positioning subsystem, planning and control subsystem, and vehicle electronic systems described above. Computer system 1000 may have a distributed architecture, where some of the components (e.g., memory and processor) are part of a computer server within an autonomous vehicle. Computer system 1000 includes at least a processor 1002, a memory 1004, a storage device 1006, input/output (I/O) peripherals 1008, and communication peripherals 1010. Interface bus 1012 is configured to communicate, transmit, and transfer data, controls, and commands among the various components of computer system 1000.

Memory 1004 and storage device 1006 include computer-readable storage media, such as RAM, ROM, electrically erasable programmable read-only memory (EEPROM), hard drives, CD-ROMs, optical storage devices, magnetic storage devices, electronic non-volatile computer storage, for example Flash® memory, and other tangible storage media. Any of such computer-readable storage media can be configured to store instructions or program codes embodying aspects of the disclosure. Memory 1004 and storage device 1006 also include computer-readable signal media.

A computer-readable signal medium includes a propagated data signal with computer-readable program code embodied therein. Such a propagated signal takes any of a variety of forms including, but not limited to, electromagnetic, optical, or any combination thereof. A computer-readable signal medium includes any computer-readable medium that is not a computer-readable storage medium and that can communicate, propagate, or transport a program for use in connection with computer system 1000.

Further, memory 1004 includes an operating system, programs, and applications. Processor 1002 is configured to execute the stored instructions and includes, for example, a logical processing unit, a microprocessor, a digital signal processor, and other processors. Memory 1004 and/or processor 1002 can be virtualized and can be hosted within another computing systems of, for example, a cloud network or a data center. I/O peripherals 1008 include user interfaces, such as a keyboard, screen (e.g., a touch screen), microphone, speaker, other input/output devices, and computing components, such as graphical processing units, serial ports, parallel ports, universal serial buses, and other input/output peripherals.

I/O peripherals 1008 are connected to processor 1002 through any of the ports coupled to interface bus 1012. Communication peripherals 1010 are configured to facilitate communication between computer system 1000 and other computing devices over a communications network and include, for example, a network interface controller, modem, wireless and wired interface cards, antenna, and other communication peripherals.

It should be appreciated that computer system 1000 is illustrative and not intended to limit embodiments of the present disclosure. Many other configurations having more or fewer components than computer system 1000 are possible. The various embodiments further can be implemented in a wide variety of operating environments, which in some cases can include one or more user computers, computing devices or processing devices, which can be used to operate any of a number of applications. User or client devices can include any of a number of general purpose personal computers, such as desktop or laptop computers running a standard or non-standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially available protocols, such as Transmission Control Protocol/Internet Protocol (TCP/IP), User Datagram Protocol (UDP), Open Systems Interconnection (OSI), File Transfer Protocol (FTP), Universal Plug and Play (UPnP), Network File System (NFS), Common Internet File System (CIFS), and the like. The network can be, for example, a local area network, a wide-area network, a virtual private network, the Internet, an intranet, an extranet, a public switched telephone network, an infrared network, a wireless network, and any combination thereof.

Computer system 1000 also include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information.

The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connections to other computing devices such as network input/output devices may be employed.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel. Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps.

Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A computer-implemented method for controlling a vehicle, the method performed by one or more processors and comprising:
   receiving tracking data associated with a surrounding environment of the vehicle;
   detecting, based upon the tracking data, an object in the surrounding environment of the vehicle;
   determining a location of the object;
   determining, based on navigation assistance data, whether the location of the object is at least partially within a classified area in the surrounding environment comprising a public transport stop or loading area; and
   configuring a control system of the vehicle to:
      initiate, based upon determining that the location of the object is not at least partially within the public transport stop or loading area, a normal collision avoidance response procedure for responding to the object; and
      initiate, based upon determining that the location of the object is at least partially within the public transport stop or loading area, a loading area collision avoidance response procedure for responding to the object;

wherein the normal collision avoidance response procedure is different from the loading area collision avoidance response procedure by being more conservative in response to movement toward a path of the vehicle by the object.

2. The computer-implemented method of claim 1, wherein the tracking data includes at least one of:
one or more images of the surrounding environment captured be one or more cameras;
LiDAR data for the surrounding environment;
radar data for the surrounding environment; or
sensor data captured by one or more ultrasonic sensors.

3. The computer-implemented method of claim 1, wherein detecting the object in the surrounding environment of the vehicle comprises detecting the object using a computer vision technique or a machine learning technique.

4. The computer-implemented method of claim 1, wherein the classified area is a bus stop.

5. The computer-implemented method of claim 1, wherein the speed of a pedestrian is amplified less in the classified area by a prediction subsystem.

6. The computer-implemented method of claim 1, wherein:
the navigation assistance data includes a map; and
the classified area is represented by a two-dimensional polygon in an area of the map corresponding to the surrounding environment of the vehicle.

7. The computer-implemented method of claim 6, wherein determining whether the location of the object is at least partially within the classified area includes determining whether coordinates of the object are within the two-dimensional polygon.

8. The computer-implemented method of claim 1, wherein the loading area collision avoidance response procedure is different from the normal collision avoidance response procedure by avoiding or reducing brakes, stops, or swerves in response to movement toward a path of the vehicle by the object.

9. The computer-implemented method of claim 1, wherein the loading area collision avoidance response procedure includes reducing a speed of the vehicle and ignoring the object.

10. The computer-implemented method of claim 1, wherein the normal collision avoidance response procedure includes:
determining, based upon the tracking data, that the object is a moving object;
determining, based upon the tracking data, a projected distance of impact from the moving object; and
operating the vehicle based on the projected distance of impact from the moving object.

11. The computer-implemented method of claim 10, wherein operating the vehicle based on the projected distance of impact from the moving object includes at least one of:
steering the vehicle to laterally shift the vehicle away from the object;
applying a brake to the vehicle to reduce a speed of the vehicle; or
applying brakes to the vehicle to stop the vehicle.

12. The computer-implemented method of claim 10, wherein the projected distance of impact from the moving object includes an amplified distance of impact from the moving object.

13. The computer-implemented method of claim 1, wherein the object includes a pedestrian.

14. The computer-implemented method of claim 1, further comprising:
tracking the object; and
configuring, based on the location of the object during the tracking, the control system of the vehicle to perform at least one of:
changing from the normal collision avoidance response procedure to the loading area collision avoidance response procedure; or
changing from the loading area collision avoidance response procedure to the normal collision avoidance response procedure.

15. A control system for an autonomous vehicle, the control system comprising:
one or more processors; and
a non-transitory computer-readable storage medium storing computer-executable instructions that, when executed by the one or more processors, causing the one or more processors to perform operations including:
receiving tracking data associated with a surrounding environment of the vehicle;
detecting, based upon the tracking data, an object in the surrounding environment of the vehicle;
determining a location of the object;
determining, based on navigation assistance data, whether the location of the object is at least partially within a classified area in the surrounding environment comprising a public transport stop or loading area; and
configuring a control system of the vehicle to:
initiate, based upon determining that the location of the object is not at least partially within the classified area, a normal collision avoidance response procedure for responding to the object; and
initiate, based upon determining that the location of the object is at least partially within the classified area, a loading area collision avoidance response procedure for responding to the object, the normal collision avoidance response procedure being different from the loading area collision avoidance response procedure by being more conservative in response to movement toward a path of the vehicle by the object.

16. The control system of claim 15, wherein the tracking data includes at least one of:
one or more images of the surrounding environment captured be one or more cameras;
LiDAR data for the surrounding environment;
radar data for the surrounding environment; or
sensor data captured by one or more ultrasonic sensors.

17. The control system of claim 15, wherein:
the navigation assistance data includes a map; and
the classified area is represented by a two-dimensional polygon in an area of the map corresponding to the surrounding environment of the vehicle,
wherein determining whether the location of the object is at least partially within the classified area includes determining whether coordinates of the object are within the two-dimensional polygon.

18. A non-transitory computer-readable storage medium storing computer-executable instructions that, when executed by one or more processors of a computing system, causing the one or more processors to perform operations including:
- receiving tracking data associated with a surrounding environment of a vehicle;
- detecting, based upon the tracking data, an object in the surrounding environment of the vehicle;
- determining a location of the object;
- determining, based on navigation assistance data, whether the location of the object is at least partially within a classified area in the surrounding environment comprising a public transport stop or loading area; and
- configuring a control system of the vehicle to:
  - initiate, based upon determining that the location of the object is not at least partially within the classified area, a normal collision avoidance response procedure for responding to the object; and
  - initiate, based upon determining that the location of the object is at least partially within the classified area, a loading area collision avoidance response procedure for responding to the object, the normal collision avoidance response procedure being different from the loading area collision avoidance response procedure by being more conservative in response to movement toward a path of the vehicle by the object;
  - wherein the loading area collision avoidance response procedure is different from the normal collision avoidance response procedure by avoiding or reducing brakes, stops, or swerves in response to movement toward a path of the vehicle by the object; and
  - wherein the speed of a pedestrian is amplified less in the classified area by a prediction subsystem.

19. The non-transitory computer-readable storage medium of claim 18, wherein the tracking data includes at least one of:
- one or more images of the surrounding environment captured be one or more cameras;
- LiDAR data for the surrounding environment;
- radar data for the surrounding environment; or
- sensor data captured by one or more ultrasonic sensors.

20. The non-transitory computer-readable storage medium of claim 18, wherein the navigation assistance data includes a map,
- wherein the classified area is represented by a two-dimensional polygon in an area of the map corresponding to the surrounding environment of the vehicle, and
- wherein determining whether the location of the object is at least partially within the classified area includes determining whether coordinates of the object are within the two-dimensional polygon.

* * * * *